Jan. 14, 1969
JAMES E. WEBB  3,421,331
ADMINISTRATOR OF THE NATIONAL AERONAUTICS
AND SPACE ADMINISTRATION
REFRIGERATION APPARATUS
Filed Jan. 26, 1968  Sheet 1 of 3
FIG. 1
PRIOR ART
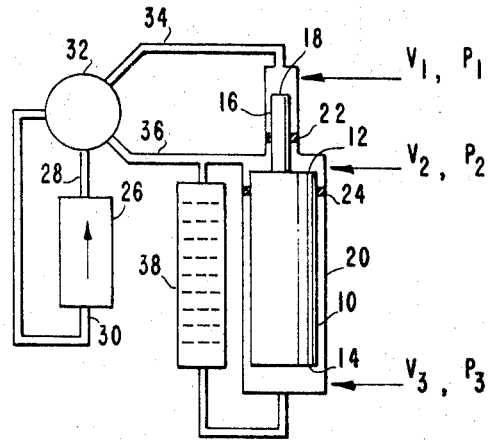
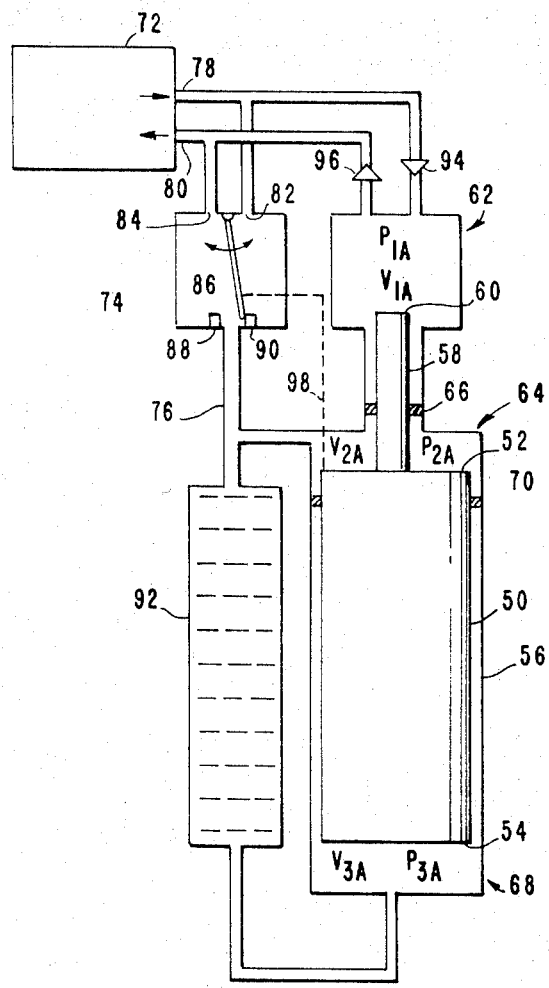
FIG. 2
INVENTOR.
WALTER H. HIGA
BY
ATTORNEYS Jan. 14, 1969    JAMES E. WEBB    3,421,331
ADMINISTRATOR OF THE NATIONAL AERONAUTICS
AND SPACE ADMINISTRATION
REFRIGERATION APPARATUS Filed Jan. 26, 1968      Sheet 3 of 3

FIG. 6

INVENTOR.
WALTER H. HIGA
BY
ATTORNEYS

United States Patent Office 3,421,331
Patented Jan. 14, 1969

3,421,331
REFRIGERATION APPARATUS
James E. Webb, Administrator of The National Aeronautics and Space Administration with respect to an invention of Walter H. Higa, Tujunga, Calif.
Continuation-in-part of application Ser. No. 574,282, Aug. 19, 1966. This application Jan. 26, 1968, Ser. No. 700,985
U.S. Cl. 62—6    8 Claims
Int. Cl. F25b 9/00

ABSTRACT OF THE DISCLOSURE

A refrigeration apparatus is disclosed which is based on the utilization of a constant intermediate pressure acting on the upper surface of a piston, coupled to the surface of a displacer. In this manner, the displacer can be reciprocally driven by a very simple two position valve assembly. A cryogenic assembly for attaining liquid helium temperatures is provided by utilizing the inventive refrigerator to cool through a counter-current heat exchanger comprising a cylinder having a helically corrugated surface disposed between concentrically oriented bodies defining two adjacent passages, a stream of gas which is filtered and expanded in a fixed, distributed restriction Joule-Thompson valve. A gas-filled thermal switch selectively couples the refrigerator in heat conducting relation with the heat load.

CROSS-REFERENCE TO A RELATED APPLICATION

The present invention is a continuation-in-part of my copending application Ser. No. 574,282 of the same title filed in the United States on Aug. 19, 1966, now Patent No. 3,367,121.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

*Field of the invention*

This invention relates generally to refrigeration apparatus and more particularly to improvements in apparatus capable of producing temperatures below −100° C. (173° K.).

*Description of the prior art*

U.S. Patent 3,119,237 discloses a method and apparatus for producing very low temperatures based upon a concept known as gas balancing. Briefly, the gas balancing concept involves balancing several confined gas volumes so that they interact with one another whereby gas compression and expansion is selectively controlled to produce a net refrigeration at one or more points in the system. As disclosed in the cited patent, a motor driven valve is employed to steer high and low pressure gas to drive a displacer for effecting the desired gas compression and expansion.

The present invention is based on the recognition that by employing a constant intermediate pressure on one surface of a piston driving the displacer, the required valving arrangement can be considerably simplified, as for example, compared to the apparatus of the cited patent. In addition to effecting a considerable simplification in the valving arrangement required, apparatus constructed in accordance with the present invention has the desirable characteristic of being self-starting.

The simplicity, efficiency and reliability of the refrigerator device of the invention renders it suitable for utilization to cool electronic devices to liquid helium temperatures. There is a presently increasing demand for highly reliable cryogenic refrigeration apparatus that can be continuously operated over extended periods with minimum downtime. This is imperative since when the refrigerator is embodied in commercial communication systems, as in the cooling of front ends of parametric amplifiers, the structure is relatively inaccessible and involves considerable dismantling for maintenance and repair.

Although the teachings of the invention are particularly useful in conjunction with gas balancing refrigeration apparatus of the type disclosed in the cited patent, it is specifically pointed out that the teachings of the invention are also applicable to other types of refrigeration systems; for example only, Stirling cycle refrigeration systems can advantageously employ the teachings of the present invention.

Briefly, in accordance with the present invention, a displacer is mounted for reciprocal movement between first and second chambers. The free surface of a piston having a second surface attached to one end surface of the displacer, is exposed to a constant intermediate pressure. Movement of the displacer controls a two position valve which couples either high or low pressure directly to one end surface of the displacer and through a regenerator to a second end surface of the displacer. In operation, the displacer is driven in the direction of the piston when a high pressure exists on both end surfaces thereof as a consequence of the difference in pressure on the displacer and piston surfaces. Movement of the displacer switches the two position valve to thereafter establish a low pressure on the displacer end surfaces resulting in the intermediate pressure on the piston surface driving the displacer back to its initial position.

Further in accordance with the invention liquid helium temperatures are achieved by utilization of a two stage refrigeration apparatus according to the invention. A flow of gas is conducted in heat exchange relation with each of said refrigeration stages and a countercurrent stream of gas. The cooled gas is further refrigerated by expansion in a Joule-Thompson valve and is then utilized to cool a heat load before being returned as the counter stream of gas in the heat exchanger. The heat load is further initially cooled by an auxiliary means comprising a thermal switch means for selectively connecting the second refrigeration stage in heat conducting relation with the heat load.

With the cryogenic refrigeration apparatus of the invention, 4.3° K. temperatures can be achieved in a considerably lessened cool downtime. Efficiency is increased and the apparatus is considerably simplified by a virtue of a combination of improvements in the refrigerator and heat exchanger and by the addition of the Joule-Thompson valve preceded by a charcoal filter and the thermal switch. This new combination results in an improved cryo-refrigerator that is more reliable in operation and requires substantially less maintenance and a concurrent substantial reduction in downtime. The refrigerator is of simplified construction and can be manufactured at substantially reduced cost.

The novel features that are considered characteristic of this invention are set forth with particularity in the appended claims. The invention will best be understood from the following description when read in connection with the accompanying drawings.

BRIEF DESCRIPTION OF THE DRAWINGS

FIGURE 1 is a schematic illustration of a refrigeration system of the type disclosed in U.S. Patent 3,119,237;

FIGURE 2 is a schematic illustration of a refrigeration apparatus in accordance with the present invention;

FIGURE 6 is an illustration of the improved cryorefrigerator apparatus of the invention shown partially schematic and partially in section.

Figure 3:
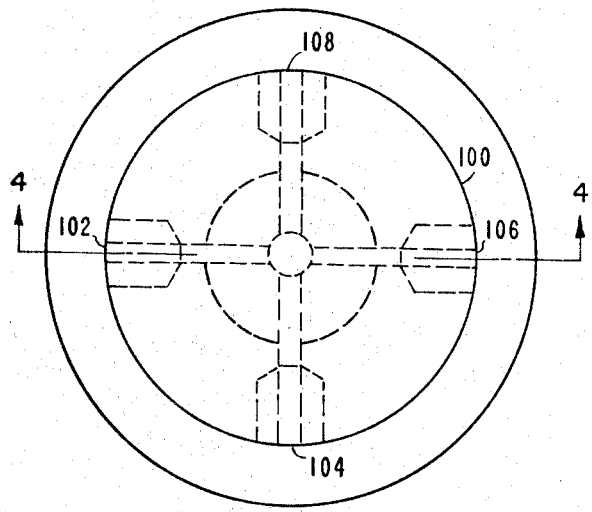
FIGURE 3 is a plan view of a preferred valving arrangement which can be employed in accordance with the present invention.

Attention is now called to FIGURE 1 which illustrates a refrigeration system of the type disclosed in U.S. Patent 3,119,237. The system of FIGURE 1 includes a displacer 10 having first and second end surfaces 12 and 14. Extending from the surface 12 is a piston 16 having a free end surface 18. The displacer 10 is mounted for reciprocal movement in a housing 20.

The surface 18 is exposed to a pressure P1 existing in a chamber or volume V1. A seal 22 isolates the volume V1 from a second chamber or volume V2. The surface 12 of the displacer 10 is exposed to the pressure P2 in volume V2. A seal 24 on the displacer isolates the volume V2 from a third chamber or volume V3 in which the surface 14 is exposed to a pressure P3.

A compressor 26 is provided having a high pressure port 28 and a low pressure port 30 both of which communicate with a motor driven valve 32. The motor driven valve is provided with a port 34 in communication with the volume V1 and a port 36 which is coupled to the volume V2 and to a first or upper end of a regenerator 38. The lower end of the regenerator 38 is coupled to the volume V3. As is well known in the art, the regenerator constitutes a device having a low heat conduction characteristic in a longitudinal direction, i.e., in the desired direction of gas flow and a high heat conduction characteristic in the transverse direction. Also, the regenerator will preferably have a high heat capacity. As a consequence of these characteristics, the regenerator should be able to maintain a large temperature gradient from one end to the other. A suitable regenerator can consist of a relatively long tube filled with lead pellets, for example.

The specific structural details of the apparatus of FIGURE 1 are set forth in U.S. Patent 3,119,237 and will thus not be repeated here. However, the operation of the apparatus of FIGURE 1 will be briefly discussed. Consider initially that the displacer 10 is in its uppermost position and that the valve 32 is driven by the motor (not shown) to admit high pressure gas to volume V1. As a consequence, the displacer 10 is forced downwardly to reduce the volume V3 to nearly zero, while increasing the volume V2 to a maximum. Subsequently, the valve 32 maintains the pressure in volume V1 and simultaneously admits high pressure gas directly to volume V2 and regenerator 38 to volume V3. During this period, the regenerator 38 removes heat from the gas stored in volume V3. Thereafter, the valve 32 releases the pressure in volume V1 while maintaining the pressure in volumes V2 and V3. This unbalancing of pressure results in displacer 10 moving upwardly to thus decrease the volumes V1 and V2 while increasing the volume V3 to a maximum volume. That is, the gas previously in volume V2 is displaced by the displacer 10 and driven through the regenerator to volume V3. The regenerator of course acts to remove some heat from the gas flowing from top to bottom therethrough. Subsequently, pressure is released in volumes V2 and V3 permitting the gas in volume V3 to expand and thus cool. In addition to being useful for cooling a load (not shown), the cool gas will remove some heat from the regenerator 38 concurrent with the initiation of a subsequent cycle in which high pressure gas is admitted to volume V1 to drive the displacer down.

In order to properly control the application of the high pressure gas to the various volumes at the appropriate times, a reasonably complex and sophisticated motor driven valving arrangement is required. Such an arrangement is disclosed in the aforecited patent. In accordance with the present invention, a considerably simpler valving arrangement can be employed by maintaining the pressure on the free surface of the piston at a constant intermediate level.

More particularly, attention is now called to FIGURE 2 which schematically illustrates a preferred embodiment of the present invention. The embodiment of FIGURE 2 includes a displacer 50, having an upper surface 52 and a lower surface 54, mounted for reciprocal movement in a housing 56. Extending from the surface 52 is a piston 58 having a free end surface 60.

The piston surface 60 is exposed to a large chamber 62 defining a volume V1A in which the pressure is identified as P1A. The surface 52 is exposed to a chamber 64 having a volume identified as V2A and a pressure identified as P2A. A seal 66 isolates chamber 62 from chamber 64. Surface 54 is exposed to a chamber 68 whose volume and pressure are respectively identified as V3A and P3A. A seal 70 isolate chamber 64 from chamber 68.

A source 72, e.g. a compressor, of high and low pressure gas is connected through a valve assembly 74 to a conduit 76. More particularly, the source 72 has a high pressure port 78 and a low pressure port 80 which are respectively coupled to inlet ports 82 and 84 of the valve assembly 74. The valve assembly can comprise a simple two position valve and is schematically illustrated in FIGURE 2 as including a hinged member 86 adapted to engage either of stops 88 and 90. Thus, when the member 86 engages stop 90, the low pressure port 84 communicates with conduit 76. On the other hand, when member 86 enagages stop 88, the high pressure port 82 communicates with conduit 76.

Conduit 76 is coupled directly to chamber 64 and through regenerator 92 to chamber 68. In order to maintain the pressure P1A in chamber 62 constant, for reasons which will be better understood hereinafter, the chamber 62 communicates through check valves 94 and 96 respectively to the high and low pressure ports 78 and 80 of the compressor 72. Dotted line 98 in FIGURE 2 represents a mechanical linkage, illustrated in detail in FIGURES 3 and 4, coupling the displacer 50 to the valve member 86.

In order to understand the operation of the apparatus of FIGURE 2, initially consider that the displacer 50 is in its uppermost position such that the volume V2A is reduced to a minimum and the volume V3A is at a maximum. In order to force the displacer 50 downwardly, the valve member 86 is moved to the position illustrated in FIGURE 2 in which the low pressure port 80 communicates with the conduit 76. As a consequence, the pressure P2A and subsequently the pressure P3A due to the time lag introduced by the regenerator 92 will decrease below the constant intermediate pressure P1A established in chamber 62. Consequently, the higher pressure on the surface 60 of the piston 58 will force the displacer 50 downwardly to maximize the volume V2A and minimize the volume V3A. The displacer 50 is coupled through linkage 98 to the valve member 86 such that when the displacer 50 moves to its lowermost position, the position of the valve member 86 is switched to thereby communicate high pressure port 78 with conduit 76. As a consequence, the pressure P2A in chamber 64 will initially increase thereby maintaining the displacer in its lowermost position for a short time. After the time delay introduced by the regenerator 92, the pressure P3A in chamber 68 will increase until the pressure P2A equals pressure P3A. Inasmuch as both pressures P2A and P3A will be greater than the intermediate pressure P1A, the displacer 50 will be driven upwardly thereby displacing the gas within the volume V2A and driving it through the regenerator to volume V3A. Of course, when the displacer 50 is driven to its uppermost position, the position of the valve member 86 is switched to thereafter communicate the low pressure port 80 with conduit 76. This permits the gas within the volume V3A to expand and cool. The displacer 50 will again remain stationary for a short interval because the pressure P3A will be larger than the pressure P2A. After the interval attributable to the regenerator 92, the pressures P3A and P2A will equalize, both being less than the pressure P1A. As a consequence, the displacer 50 will be forced downwardly thus driving the cold gas out of volume V3A through the regenerator to remove some heat therefrom to thereby better enable the regenerator to remove heat from gas flowing therethrough during a subsequent cycle.

The relief valves 94 and 96 maintain the pressure P1A constant thus compensating for any small leaks which might be present. That is, if the pressure P1A is reduced due to the presence of a leak, the relief valve 94 will open thus communicating the high pressure port 78 with the chamber 62 to increase the pressure P1A. Similarly, if the pressure P1A increases for any reason, the relief valve 96 will open to communicate the low pressure port 80 with the chamber 62 and thus reduce the pressure P1A.

Figure 4:
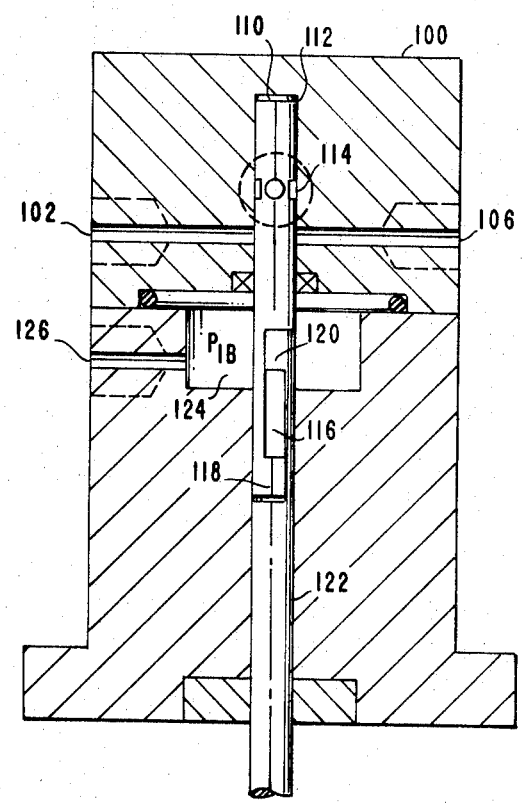
FIGURE 4 is a sectional view taken along the plane 4—4 of FIGURE 3.

Attention is now called to FIGURES 3 and 4 which illustrate a preferred embodiment of the valve assembly 74 shown in FIGURE 2. More particularly, the valve assembly of FIGURES 3 and 4 is comprised of a housing 100 through which extend radially projecting ports 102, 104, 106, and 108. Ports 102 and 106 are aligned in the same horizontal plane as shown in FIGURE 4. Similarly, ports 104 and 108 are aligned in the same horizontal plane which is different from the plane of ports 102 and 106. Port 102 is adapted to be coupled to the high pressure port 78 of the compressor 72 shown in FIGURE 2. Port 104 on the other hand is adapted to be coupled to the low pressure port 80 of compressor 72. Ports 106 and 108 are adapted to be coupled to the conduit 76 shown in FIGURE 2 which, it will be recalled, communicates with the regenerator 92 and chamber 64.

Contained within the housing 100 is a valve member 110 adapted to move reciprocally in channel 112. The valve member 110 is provided with an annular slot 114 adapted to communicate opposed ports lying in the same plane. Thus, when the valve member 110 is in its upper position as illustrated in FIGURE 4, the annular slot 114 is aligned in the horizontal plane of the ports 104 and 108. Thus, the low pressure port 80 of the compressor 72 is coupled to the conduit 76. On the other hand, when the annular slot 114 is aligned in the plane of the ports 102 and 106, the high pressure port 78 of the compressor 72 communicates with the conduit 76.

A long keyway 116 is defined in the lower end of the valve member 110. More particularly, the keyway 116 is defined between the main body of the valve member 110 and a terminal stop 118. A terminal key 120 is defined on the upper end of the drive piston 122. The key 120 is adapted to slide in the keyway 116. Thus, the valve member 110 is moved only during a small portion of the movement of the piston 122. More particularly, when the piston 122 (corresponding to the piston 58 of FIGURE 2) is moved downwardly, the key 120 will engage the terminal stop 118 toward the end of the piston movement to thus draw the valve member 110 downwardly to align the annular slot 114 with the ports 102 and 106. On the other hand, when the piston 122 is moved upwardly, the key 120 will reach the end of the keyway 116 toward the end of the piston movement and only then will the annular slot 114 communicate the ports 104 and 108. Typically, the valve member 110 can exhibit a quarter-inch movement for a one-inch piston movement.

A chamber 124 is defined adjacent the upper surface of the piston 122. The chamber 124 corresponds to the constant pressure chamber 62 illustrated in FIGURE 2. Thus a constant pressure P1B is established in this chamber. The chamber 124 communicates through port 126 with the previously referred to check valves 94 and 96.

In the operation of the valve assembly of FIGURES 3 and 4, initially consider the valve member 110 to be in its uppermost position communicating ports 104 and 108. Thus low pressure is connected to the conduit 76. As previously discussed, when the pressure in the chambers 64 and 68 (FIGURE 2) equalizes at the low pressure of the compressor 72, the pressure P1B in chamber 24 acting on the end surface of the piston 122 will force the piston downwardly to compress the volume V3A shown in FIGURE 2. Toward the end of the movement of the piston 122, the valve member 110 will be pulled downwardly when the key 122 engages the terminal stop 118. In its lower position, the annular slot 114 in the valve member 110 will communicate the high pressure port 102 with the port 106 thereby applying a high pressure directly to the chamber 64 of FIGURE 2 and through the regenerator to the chamber 68. When these pressures equalize, of course, the displacer will be forced upwardly. Accordingly, it should now be apparent that the structurally illustrated valve assembly of FIGURES 3 and 4 is the equivalent of the valve assembly 74 in FIGURE 2 and will satisfactorily operate to duplicate the thermodynamic cycle described in the aforecited patent.

It is important to note that the time delay due to the regenerator should operate to produce the desired result. More specifically, the linkage between the valve member 110 and piston 122 in FIGURE 4 should be so designed that when the piston moves downwardly, it starts to pull the valve member 110 down toward the end of its movement. Inasmuch as a braking force may be encountered, it is important that the valve member get just far enough to begin to admit the high pressure gas from port 102 through port 106 to the upper surface of the displacer. The high pressure momentarily acting on the upper displacer surface (i.e. in chamber 64 of FIGURE 2), insures completion of the downward stroke. Similarly, completion of the upward stroke is assured by designing the components such that the greater pressure on the lower displacer surface (i.e. in chamber 68 of FIGURE 2), as compared to the pressure in chamber 64, will force the displacer upwardly.

Figure 5:
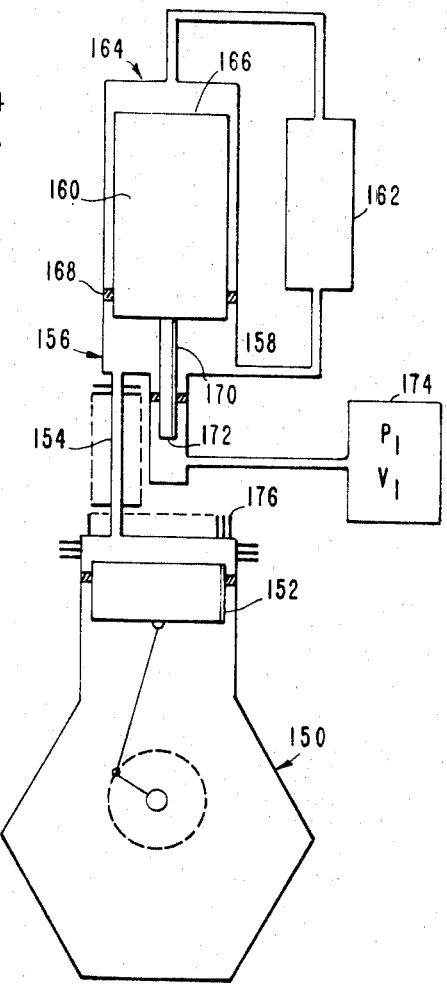
FIGURE 5 is a schematic illustration of a Stirling cycle refrigeration system employing the teachings of the present invention.

Although the discussion thus far has pertained to the application of the invention to a gas balancing refrigeration apparatus, it should be understood that the teachings are applicable to other types of refrigeration apparatus. In order to demonstrate this, FIGURE 5 schematically illustrates a refrigeration apparatus operable in accordance with a Stirling cycle which is similar to the gas balancing cycle. More particularly, the apparatus of FIGURE 5 includes an apparatus 150 for reciprocally driving a compressor piston 152 which communicates with the port 154. The port 154 communicates with a chamber 156 to which the surface 158 of the displacer 160 is exposed. The chamber 156 communicates through the regenerator 162 with the chamber 164 to which the displacer surface 166 is exposed. Seal 168 isolates chamber 156 from chamber 164. Drive piston 170 is fixed to displacer 160. The free end surface 172 thereof communicates with chamber 174 in which a constant intermediate pressure is maintained.

In the operation of the apparatus of FIGURE 5, on the compression stroke of the apparatus 150, the displacer 160 is up and remains there until near the peak pressure point when the drive piston 152 is forced downwardly by the high pressure. The displacer 160 transfers gas through the regenerator 162 to the cold end of the displacer adjacent cooling fins 176. On the expansion stroke of the apparatus 150, the displacer remains down and gas expands through the regenerator 162. Subsequently, the intermediate pressure on the surface 172 of the piston 170 moves the displacer up and drives the remaining cold gas out through the regenerator 162. The cycle then repeats.

An embodiment of the liquid helium temperature cryo-refrigeration apparatus of the invention is illustrated in FIGURE 6. The refrigeration system of FIGURE 6 generally incorporates a source of high pressure such as a compressor 200 for driving a multi-displacer heat engine including a first refrigeration stage 202 mechanically connected through coupler 258 to a second coaxial refrigeration stage 204. Compressed gas also flows from conduit 224 through a series of three counterflow heat exchangers 206, 208 and 210. Contaminants are removed in filter 214 and the gas is expanded and liquified at constant flow rate in Joule-Thompson valve 216. The input gas to the heat exchangers flows in heat conducting relation with refrigeration stages 202 and 204 and with the low pressure gas returning from the Joule-Thompson valve 216 through countercurrent circuit 212. The expanded and liquified helium flows through coils 218 to cool the heat load support 220. The gas is then returned to the countercurrent circuit 212. The heat load support 220 is also pre-cooled by means of thermal switch 222 which selectively connects the second refrigeration stage 204 to the heat load support 220.

The lowest temperature practically obtainable with the multi-stage regenerator refrigerator is about 10 to 12° K. This limitation is due to the thermal characteristics inherent in the materials from which regenerators are constructed. However, since these temperatures are well below the inversion temperature of helium, the application of Joule-Thompson expansion becomes feasible to obtain refrigeration down to about 4° K. The input to the Joule-Thompson stage is brought to near the inversion temperature by the counterflow heat exchangers 206, 208 and 210, which are in thermal contact with each of the refrigeration stages 202 and 204. Heat is transferred from the warm input stream to the gas returning to the low pressure side of the compressor from the Joule-Thompson valve 16.

High pressure helium gas is delivered to the cascade of heat exchangers through branch conduit 224. The gas is cooled first to around 70° K. as it leaves exchanger 206 by being conducted in heat exchange relation with the first refrigeration stage at thermal contact 226. The high pressure gas is then further cooled to 15° K. as it leaves heat exchanger 208 by being conducted in heat exchange relation with the second refrigeration stage 204 at thermal contact 228. Finally, expansion at the Joule-Thompson valve 216 liquifies the gas and produces one watt of refrigeration at approximately 4.3° K. The three heat exchangers are essential in optimizing a very inefficient process.

A good heat exchanger must provide good transverse conduction and, in addition, flow resistance must be minimized. In accordance with the invention, a high flow rate heat exchanger having the desired thermal conductivity characteristics is provided. A Phosphor-bronze cylinder having a helically corrugated surface disposed between concentrically oriented bodies to define two flow passages has been found to have excellent properties for cryogenic applications. Separate countercurrent paths are provided on adjacent sides of the corrugated cylinder 290 by disposing it between concentric stainless steel tubes 292 and 294. A plug 296 is sealed into the inner tube at each end thereof forming an inlet head space 298 and an outlet head space 300 in each exchanger. Inlet ports 302 and outlet ports 303 provided in the inner tube 200 within this space to form the first flow path of gas between the outer surface of the inner stainless steel tube 292 and the inner surface of the convolutions. The adjacent flow path is provided between the outer surface of the convolutions of the corrugated cylinder 290 and the inner surface of the outer tube 294. Gas is delivered to the outer flow path through a port in end plate 304 and leaves through a similar port in end plate 306.

The use of stainless steel tubes which are thermal insulators at the cryogenic temperatures contributes to the efficient exchange of heat between the adjacent streams of gas. Good brazing and welding techniques should be utilized to assure a leak free heat exchanger. At the warm end of the heat exchanger system, a larger clearance should be provided to reduce flow restriction to the low pressure return gas. The bellows type corrugated cylinder should be stretched to reduce flow resistance. Though the dimensions are not critical for a one watt refrigerator, a well balanced design having an efficient cooldown rate and reserve capacity is indicated in the following table.

TABLE I

| Heat exchanger | Length (in.) | I.D. (in). | O.D. (in.) | No. of convolutions |
|---|---|---|---|---|
| No. 203 | 10.5 | *.75/.67 | 1.25 | 72 |
| No. 208 | 7 | .54 | .875 | 53 |
| No. 210 | 5.5 | .375 | .64 | 61 |

(2 in series)
*At warm end a larger clearance was provided to reduce flow restriction to the low pressure return gas.

Heat exchangers of these dimensions have been found very satisfactory for use in a 4.3° K. refrigerator. A fixed J–T valve with a distributed restriction has been found to be very reliable. The distributed restriction has prevented valve clogging as has the provision of a charcoal filter 214 immediately before the valve for eliminating contaminates. In the present embodiment, flow rates of one standard cubic foot per minute at 300 p.s.i. supply pressure and 15 p.s.i. return pressure were required for one watt of refrigeration at 4.4° K.

In order to avoid the necessity for inordinate cooldown time for the relatively inefficient Joule-Thompson circuit, it is advisable to provide means for precooling the heat load such as a traveling wave maser attached to the support 220. The station will be at ambient temperature and will cool very slowly unless provided with auxiliary cooling. A simple way to precool the load is to provide thermal contact between the second refrigerator which is at 15° K. and the support 220. However, after the station has reached thermal equilibrium with refrigerator, it is desirable to cut off the heat flow so as not to overload the very inefficient Joule-Thompson stage. This is accomplished by the use of a thermal switch containing a gas which condenses above the temperature of the heat station and becomes a thermal insulator in this condition. This effect can be augmented by a judicious choice of metals.

These criteria are met in the thermal switch utilized in the invention, which includes a chamber 280 for enclosing a condensible gas such as hydrogen or neon. The chamber is formed between two heat conducting copper end plates 282 and 284, having concentric cylindrical members 286 and 289 attached thereto, extending into the chamber 280. End plate 282 is thermodynamically coupled to the outside wall 278 of chamber 259 by means of a solid metal heat conductor 279. A similar solid metal heat conductor 281 thermodynamically couples end plate 284 to the heat load support 220.

The sides of the device are formed from a stainless steel shell 288, which is attached to each of the end pieces 282 and 284. Copper is a good thermal conductor during the heat transfer stage of the thermal switch and stainless steel is a fairly good nonconductor of heat at cryogenic temperatures. This contributes to insulating the device from the environment. During cooldown, the gas provides good heat conduction between the concentric copper tubes then at about 15° K., the gas condenses and there is virtually no conduction between the two ends of the thermal switch. In this manner, the switch 222 provides thermal conduction between the 15° station and the final 4.3-° K. station during the cooldown phase and changes to an open circuit below 15° K.

The refrigerator engine is similar to that of FIGURE 5 and includes a compressor 200 in which a piston 230 with a sealing ring 232 is reciprocally driven by a motor 234 through linkage 236. High pressure gas from the compressor enters the first refrigeration stage 202 through conduit 238 which communicates with chamber 245 in which the end surface 246 of the displacer 239 is disposed.

A second refrigeration stage displacer 240 is disposed within casing 264 in coaxial alignment with and is adapted to move in unison with displacer 239 by means of a mechanical coupling 258. Each displacer 239 and 240 is surrounded by a concentric regenerator 243 and 244 and is placed in relatively close fitting relation with the inner surface of the regenerators by means of sealing rings 241 and 276. The chamber 245 communicates through ports 248 and 250 with the chamber 252 in which the displacer end surface 254 is exposed. Chamber 252 is also in communication with the variable volume chamber 259 containing the end surface 257 of displacer 240 through the regenerator top 244. The flow path is completed through ports 266 and 253. Chamber 252 is sealed from chamber 259 by sealing ring 276 disposed between the wall 268 of displacer 240 and the wall 242 of the regenerator 244. A drive piston 256 is fixed to displacer 239 and the free end surface 260 of the piston 256 communicates with chamber 262 in which a constant intermediate pressure is maintained.

The operation of the apparatus of FIGURE 6 is similar to that described for the Stirling cycle operation of the apparatus of FIGURE 5. On the compression stroke of the compressor 230, the displacers 239 and 240 are down and remain there until the near peak pressure is reached at which point the piston 260 is forced upwardly by the high pressure. The displacer 239 transfers gas through the concentric regenerator 243 to the cold end of the displacer 239 adjacent the thermal contact area 226 and through regenerator 244 to variable volume space 259. On the expansion stroke of the piston 230, the displacer 239 remains up and gas expands through the regenerators 243 and 244. Subsequently, the intermediate pressure on the end surface 260 of the piston 256 moves the displacers 239 and 240 down and drives the remaining cold gas out through the regenerators 243 and 244. The cycle then repeats. The net effect is that at equilibrium the lower successive stage is colder than the preceding stage.

The addition of a Joule-Thompson circuit having a distributed restriction in combination with a filter and the unique counterflow heat exchangers when combined with the refrigerator of the invention, have been found to result in a reliable and highly efficient cryogenic refrigerator showing promise for minimal maintainance in the low noise receiver art.

From the foregoing, it should be appreciated that an apparatus has been disclosed herein in which a constant source of intermediate pressure is employed to reciprocally drive a displacer for effecting the compression and expansion of a gas to thereby effect cooling. Although specific embodiments of the invention have been disclosed herein, it is recognized that variations and modifications will occur to those skilled in the art falling within the spirit of the invention and accordingly it is not intended that the scope of the invention be limited by the specifically disclosed embodiments.

What is claimed is:
1. A cryogenic apparatus comprising in combination:
a refrigeration apparatus including a displacer mounted for reciprocal movement between first and second variable volume chambers to alternately effect expansion and compression thereof, a piston coupled to said displacer and defining an end surface remote therefrom, a third chamber, said piston end surface being disposed within said third chamber and means establishing a constant pressure within said third chamber;
counterflow heat exchange means in indirect heat exchange connection with said refrigeration apparatus for receiving counter-current flow of gas;
means for supporting a heat load;
thermal switch means for selectively connecting said refrigeration apparatus to said support means;
Joule-Thompson valve means for receiving a first gas output from the heat exchange means and for expanding and cooling said gas;
means for conducting said gas to said support means; and
means for returning the gas to said heat exchange means.

2. The apparatus according to claim 1 further including a filter means for purifying the input to said Joule-Thompson valve.

3. The apparatus according to claim 1 in which said refrigeration apparatus includes a regenerator concentrically surrounding the displacer.

4. The apparatus according to claim 1 wherein said thermal switch is heat conducting above the temperature of the refrigeration apparatus and heat insulating below said temperature.

5. The apparatus according to claim 1 wherein said heat exchanger contains counter-current flow channels formed on each side of the helical convolutions of a helically corrugated cylinder mounted between two concentrically oriented cylinders.

6. The apparatus according to claim 5 in which said inner and outer cylindrical tubes are formed of steel and said helically corrugated cylinder is formed of a Phosphor-bronze alloy.

7. The apparatus according to claim 1 in which the Joule-Thompson valve contains a fixed distributed restriction expansion means.

8. A cryogenic apparatus comprising in combination:
a first refrigerator stage including a first displacer mounted for reciprocal movement between first and second variable volume chambers to alternately effect compression and expansion thereof and a piston coupled to the displacer having an end surface disposed within a constant pressure chamber;
a second refrigeration stage including a second displacer mechanically coupled to said first displacer;
heat exchange means establishing a counter-current flow of gas, said means containing counter-current flow channels formed on each side of helical convolutions of a helically corrugated cylinder mounted between two concentrically oriented cylinders, the first input stream thereto being in heat conduction relation with each of said refrigerator stages and a counter-current stream of gas;
a station for supporting a heat load;
valve means for expanding a gas;
means for connecting said input stream to said valve means and for connecting the output of said valve means in heat conducting relation with said station and then for returning said gas to said heat exchange means; and
thermal switch means for selectively connecting said second refrigerator stage in heat conducting relation with said station.

References Cited

UNITED STATES PATENTS

| 3,221,509 | 12/1965 | Garwin | 62—6 |
| 3,260,055 | 7/1966 | Webb | 62—6 |
| 3,274,786 | 9/1966 | Hogan | 62—6 |
| 3,299,646 | 1/1967 | Stuart | 62—6 |
| 3,360,955 | 1/1968 | Witter | 62—6 |

WILLIAM J. WYE, *Primary Examiner.*